United States Patent [19]

Freed et al.

[11] 4,017,576
[45] Apr. 12, 1977

[54] METHOD OF LINING A PLUG VALVE

[75] Inventors: Jacob B. Freed, Battle Creek, Mich.; Victor G. Reiling, Dayton, Ohio

[73] Assignee: Union Pump Company, Battle Creek, Mich.

[22] Filed: May 28, 1974

[21] Appl. No.: 473,379

Related U.S. Application Data

[60] Continuation of Ser. No. 273,193, July 19, 1972, abandoned, which is a division of Ser. No. 35,016, May 6, 1970, Pat. No. 3,698,422.

[52] U.S. Cl. .............................. 264/91; 264/112; 264/127; 264/269; 264/313; 264/DIG. 50
[51] Int. Cl.² ...................... B29D 23/01; B27J 5/00
[58] Field of Search .......... 264/127, 269, DIG. 50, 264/90, 91, 323, 112

[56] References Cited
UNITED STATES PATENTS

| | | | |
|---|---|---|---|
| 2,584,501 | 2/1952 | Roberts | 264/90 |
| 2,789,934 | 4/1957 | Busbach | 264/269 |
| 3,015,855 | 1/1962 | Merkel | 264/127 |
| 3,038,199 | 6/1962 | Bartow et al. | 264/DIG. 50 |
| 3,050,786 | 8/1962 | St. John et al. | 264/269 |
| 3,494,813 | 2/1970 | Lawrence et al. | 264/90 |
| 3,537,700 | 11/1970 | Schenck, Jr. et al. | 264/127 |
| 3,597,820 | 8/1971 | Schenck, Jr. | 264/127 |

*Primary Examiner*—Robert F. White
*Assistant Examiner*—James B. Lowe
*Attorney, Agent, or Firm*—Price, Heneveld, Huizenga & Cooper

[57] ABSTRACT

A plug valve whose chamber or bore and whose runs or port passages are fully lined with corrosion-resistant material, most preferably polytetrafluoroethylene, such valve having recesses in its runs, near their intersection with the bore, into which lining material distended by heat and pressure may creep, and with the valve body defining an internally-rounded concave wall or dome at the bottom of the bore. The lining material is formed within the runs so as to be under tension longitudinally between the bore and the outer ends of the runs, and the lining material extends integrally upwardly from the bore and outwardly of the valve body to define a thick collar immediately above the neck of the bore. The valve is manufactured by use of an integral hollow rubber or like forming element comprised of tubular legs, and is placed inside the valve body with one such tubular leg extending through each run and through the bore. Different components of a multipart mandrel are then inserted inside the tubular legs of the forming element and assembled together therewithin. Following this, the space between the rubber forming element and the inner walls of the valve body are filled with lining material, which is then compacted by resilient outer expansion of the forming element. Subsequently, the valve body and the compacted lining material are heated to coalesce or cure the latter in place.

16 Claims, 7 Drawing Figures

METHOD OF LINING A PLUG VALVE

This is a continuation of Ser. No. 273,193, filed July 19, 1972, now abandoned, which is a division of Ser. No. 35,016, filed May 6, 1970, now U.S. Pat. No. 3,698,422.

BACKGROUND OF THE INVENTION

This invention relates broadly to valves and fluid flow-control members, and more particularly to plug valves. More particularly still, the invention relates to plug valves which are fully lined with corrosion-resistant material, for example, the fluorocarbon polymer known as polytetrafluoroethylene (PTFE).

The problems and difficulties associated with conduit systems used to convey highly corrosive chemicals and like fluids have for many years proved to be extremely troublesome to those working in this field, and this is particularly true with respect to valves used in such an environment. Many approaches have been suggested in the past for overcoming these problems, or at least for diminishing them. Basically, it is fair to say that the principal effort embodied in these approaches has been to line the interior of the various conduit system parts, including the conduit itself, in-line fittings, and even the valves used in the system, with some non-corrosive or corrosion-resistant material.

For example, lining a valve body for such a purpose was suggested at least as long as 40 years ago (U.S. Pat. No. 1,827,266), and many different forms of this approach have since been suggested. For the most part, development has taken place through suggested uses of plastic resins for lining materials, since such materials are substantially inert chemically and, additionally, many have lubricous surface characteristics which greatly facilitate smooth and easy operation of tightly-fitting valve members.

In relatively recent times, polytetrafluoroethylene has emerged as the most favored material for forming such linings, due to its various superior qualities which are now relatively well-known. Very often, a preformed tube or other such element made of PTFE is inserted or otherwise mechanically attached in place over a given surface which is to be protected in order to form the desired lining, although other processes are also known. Valves and valve components, as well as conduit fittings and the like, using such material as a lining or coating have heretofore been described or suggested, for example, in the United States Pat. Nos. to Johnson (3,073,336), Chu (3,148,896), McFarland (3,205,113), Boteler (3,206,530), Keen (3,223,763), Yost (3,227,174), Lowrey (3,334,650), Schenck (3,438,388) and Schenck et al. (3,459,213). In certain of these prior patents, the concept is advanced of using granular or powdered PTFE for forming the lining member, in which process the powdered material is compressed into a preform and subsequently sintered so as to coalesce it into a homogeneous lining or coating which is said to be of substantially uniform density and of substantially completely fluid-impervious characteristics. This basic technique of molding powdered materials has long been used in ceramics and metallurgy, and such technique has also been long known as a way of utilizing powdered PTFE, even prior to the usage of such material in valves or fittings. For example, reference is made to the United States patents to Benning et al. (2,400,094) and Cresap (2,929,109), as well as to the Canadian Patent to Deakin (566,811).

Notwithstanding the foregoing, the total successfulness of fully-lined valves continues to remain considerably less than that which is needed and desired. Principally, the reason for this is that known types of PTFE liners are not sufficiently reliable and are subject to leakage of the corrosive fluids, as by major rupture under heat and pressure, or through the development of pinholes and other minor voids or imperfections or unduly thin sections, through which the corrosive fluid may leak or pass by permeation. This remains true despite careful manufacturing procedures and, to a certain extent, is believed to be somewhat inherent in the manufacturing processes practiced heretofore, which are themselves somewhat involved, complicated, and subject to a relatively high degree of failure or reject parts.

SUMMARY OF THE INVENTION

The present invention provides as one of its major objectives a new approach in the manufacture of fully-lined valves and the like, which overcomes many of the disadvantages and shortcomings of previous manufacturing processes for such products. In accordance with the invention, an integral one-piece liner is molded in place directly within the valve body, in the same configuration in which it is used in actual service, and totally without the necessity of separately forming a tube or the like which is subsequently inserted into the valve and then heated and blown into place, as characterizes certain previous methods and products taught by some of the prior patents set forth above. The finished product according to the invention thus conforms very generally to the confines and internal configuration of the valve body or like article into which it is formed, and the lining which is so produced is free of highly-stressed areas drawn thin from being expanded into place. Further, the lining thickness is controllable and variable at different points within the structure in accordance with desires, and particular details of shape in the internal configuration of the lining are not in any sense necessarily determined by the configuration of the body in which it is formed, as is true of prior manufactures, even though the outer configuration of the present lining does for the most part conform directly to the confines of such body.

Another important objective of the invention is, in a preferred embodiment in which a plug valve is produced, a fully-lined valve body in which the lining within the runs or port passages is of substantially the same thickness as at other points within the valve body but is under longitudinal tension between the bore and the outer ends of the runs, and in which pocket-like recesses are provided in the sides of the runs, into which lining material distended by heat and pressure forces may creep or flow as the lining material undergoes thermal expansion and other similar physical change.

A further important objective of the invention, and an important advantage provided thereby, is the provision of a fully-lined three-way or multi-port plug valve with a lining which is molded in place and which has the controllable thickness and other characteristics mentioned hereinabove.

Another important objective of the invention is to provide a fully-lined plug valve in which the lining forms an integral crown-like annular protrusion which extends out of the valve body opening through which the valve plug is inserted and annularly encircles and contacts the upper sides of the plug along an appreciable length thereof, and an associated but further objective is the presence of an integral annular recess in such crown-like protrusion which extends about the upper plug, between spaced points of liner contact therewith.

A still further major objective of the invention is to provide a new method of manufacturing a lined valve or the like, in which the lining is molded in place from powdered PTFE by pressure compaction through the use of a rubber or other resilient forming element into which is fitted a forming mandrel having a plurality of mutually-separable parts.

Briefly stated, the lined valve of the invention has pocket-like recesses in its port passages or runs to accommodate expansion or distension of lining material, has a smoothly rounded domed bottom wall in the plug chamber to provide for crack-free lining formation, has a relatively heavy and thick molded-in-place lining of uniformly compressed and sintered PTFE which varies in thickness at predetermined selected points and defines particular structural configurations including an annular crowning protuberance at the plug chamber opening in the valve body, and the lining is under longitudinal tension in the runs, between their end extremities and the bore or chamber. The lining is formed in place by a process which includes the steps of inserting a resiliently flexible forming element having tubular extremities fitting into the runs and the chamber or bore, resiliently expanding such element to permit insertion therein of the different component parts of a multi-component mandrel whose external size is slightly greater than the normal relaxed size of the elastic forming element, and assembling the mandrel parts together within the forming element after insertion of the latter into the valve body.

The foregoing objectives, advantages, and major features of the invention, together with other advantages and features thereof, will become more apparent upon consideration of the ensuing specification and the attached drawings, described briefly herebelow.

DESCRIPTION OF THE PREFERRED EMBODIMENT

Figure 1:
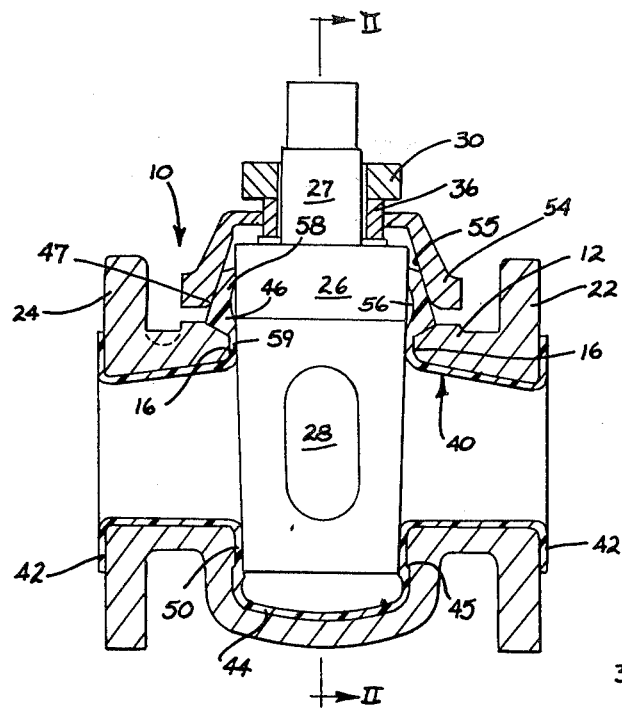
FIG. 1 is a side elevational view of a valve in accordance with the invention, shown in central section.

Basically, the valve 10 shown in FIGS. 1–6 and used to describe a preferred embodiment of the invention is, in its overall nature, of well-known attributes. That is, it includes a valve body 12, normally made of cast iron, which defines a central bore 14 (FIG. 5) that may be described as generally cylindrical but which is normally slightly conical, being tapered slightly at a downward convergent angle of on the order of about 2°. The bore 14 opens outwardly through a side of the valve body 12, at an opening defined by a neck portion 16, constituting a heavy rounded ridge or lip. The valve body also defines port passages or runs 18 and 20 which extend generally transversely of the bore 14 and communicate with the latter. The runs 18 and 20 terminate in radial end flanges 22 and 24, respectively, by which the valve body is attached to similarly flared pipes or other such conduit members.

A generally cylindrical (but actually slightly tapered) plug or valving member 26 (which advantageously has a coating or exterior of PTFE) (FIGS. 1 and 2) is seated within the bore 14, to control the flow of fluids from one of the passages or runs to the other, by means of a port 28 extending through the plug and in alignment with the two runs. The plug 26 has an upwardly-extending stem or shank 27, on which is formed a pair of flats 27a for receiving a wrench or like leverage member which, when moved, will rotate the plug and thereby control flow through the valve. The plug is retained in place and forced downwardly into the bore by a retaining plate 30 which has a central opening through which the stem 27 passes, and which is secured to the valve body by bolts 32 which pass through lateral flanges 34 defined by the valve body. The retaining plate 30 may thus be drawn tightly downwardly against an annular thrust bearing 36, which in turn presses downwardly on the plug, preferably through a thrust washer 38 which should have lubricous surface properties.

Figure 2:
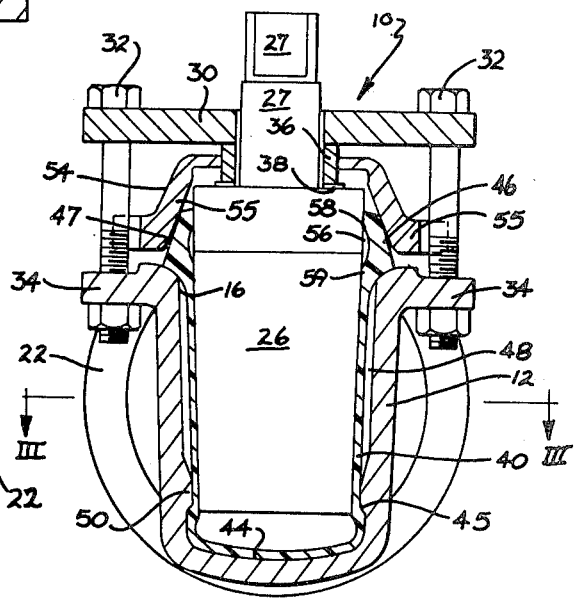
FIG. 2 is a sectional end elevational view taken through the plane II—II of FIG. 1.
Figure 3:
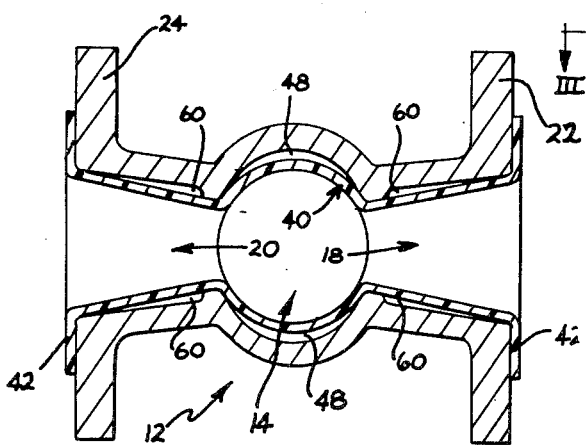
FIG. 3 is a sectional overhead plan view taken through the plane III—III of FIG. 2.

In accordance with the invention, an integral one-piece liner 40 is formed directly in place within the valve body, covering the bore 14, the neck 16 at the top of the bore, and the port passages 18 and 20 in their entirety, as well as covering a portion of the end flanges 22 and 24 at the outer end extremities of the port passages. The liner 40, whose manufacture is discussed hereinafter, is continuous throughout the bore and the port passages, and defines integral flared, bell-like end extremities 42 which overlie parts of the outer faces of the end flanges 22 and 24. Also, the liner follows the curvature of the valve body at both the top and bottom of the bore 14, to define a smoothly curved, dished concave portion 44 at the bottom of the bore and a generally tubular upwardly-extending crown portion 46 at the top of the bore, above the neck 16, which is covered about its periphery by the liner. As illustrated in FIGS. 1 and 2, at the bottom of the bore 14 the valve body 12 defines a slight enlargement forming a sharply-angled annular shoulder 45, and the outer surface of the liner is formed with a complementary shoulder which indexes behind that in the body. Beneath the shoulder 45, the bottom of the bore defines a smoothly-rounded domed or dished curvature extending throughout the bottom of the bore.

The neck 16 at the top of the bore is generally continuous, in that it has no sharply-angled deviations, but the neck opening is not necessarily circular, and this is the case in the preferred embodiment illustrated. That is, the lateral sides of the valve body within the bore define recesses 48 (FIGS. 2, 3 and 5) which are positioned generally transversely of the passages or runs 18 and 20, and these recesses may continue upwardly into the neck 16 to provide a generally oval neck configuration which is substantially identical to the shape shown in central section in FIG. 3 and which does not match the cross-sectional shape of the plug in this area, since the latter is, of course, circular in cross section. In this regard, it will be noted that the lower extremity of the bore 14 immediately above the aforementioned shoulder 45 defines a generally circular, annular ridge 50 which is fully covered by the liner 40 and which receives the lower extremity of the plug 26. Ridge 50 has a shape and taper complementary to that of the plug, so as to support the lower end of the plug at this point. Furthermore, the annular support 50 smoothly merges with the portions of the bore located at the areas of intersection therewith of the passages or runs, to provide a curving, generally oval, vertical support 52 (FIG. 4) for the plug on each opposite side thereof, such vertical support including portions of the neck 16 referred to previously (note FIGS. 1 and 5). In this manner, the plug is very adequately supported in proper position and during its rotary movements, without the necessity of a completely annular support at the top in a plane parallel to the lower annular support 50.

In the latter respect, the upwardly-protruding crown portion 46 of the liner mentioned above does, in addition to providing a continuous seal against the upper portions of the plug, also provide a certain amount of positioning support for the latter. That is, the crown 46 has a relatively large, upwardly-inclined frusto-conical shoulder 47 which is disposed at an upwardly-converging angle with respect to the longitudinal axis of the bore and the plug seated within the bore. This shoulder provides a bearing area for an upwardly-concave, dish-shaped retainer structure 54 (FIGS. 1 and 2) which is attached to the thrust bearing 36 mentioned previously and which is forced downwardly with the thrust bearing as the bolts 32 are tightened into place to force the plug-retaining plate 30 downwardly against the thrust bearing. Retainer 54 has an inner frusto-conical surface 55 which is angled with respect to the longitudinal axis of the bore and of the plug at an angle similar to (or slightly greater than), the corresponding angle of the outer shoulder 47 on the top crown 46; consequently, downward force applied to the retainer 54 serves to annularly contract the crown 46 about the upper extremities of the plug 26, thereby providing a snug retaining contact therebetween. In accordance with the invention, frictional forces between the crown 46 and the upper extremities of the plug 26 are advantageously reduced by the provision of an integral groove-like recess 56 in the crown which annularly encircles the upper portion of the plug and provides for a pair of spaced annular encirclements 58 and 59 which are thus formed on the inner surface of the crown 46, in contact with the plug. As illustrated (FIG. 2), the retainer 54 has recessed or slotted projecting edge extremities 55 which at least partially straddle the bolts 32, to inhibit any rotation which might otherwise be imparted to the retainer as a result of rotation of the plug 26.

An important feature of the valve according to the invention is the presence in each of the runs or port passages 18 and 20 of a pair of pocket-like recesses 60 (FIG. 3 and 5), formed in the sides of the runs near their intersection with the bore 14. As illustrated, these recesses are preferably deeper near the bore, tapering toward and blending into the otherwise continuous or uninterrupted walls of the port passages near their outer extremities, where the end flanges 22 and 24 are located. In this respect, it will be noted that the top and bottom of the port passages are essentially linear, although, of course, the passages themselves are basically oval in overall shape (note FIG. 4), having substantially the same configuration as the port 28 in the plug 26 (seen in FIG. 1). This essentially smooth and continuous wall configuration, which is typical for the entire inner periphery of port passages or runs in the conventional valve body of the basic type illustrated herein, being devoid of angular deviations or lateral enlargements, is what is intended herein by the use of the term "continuous" inner walls. The true importance of the pocket-like recesses 60 will be understood more completely upon consideration of the nature of the liner 40 and the method of its manufacture, disclosed hereinafter; however, it should here be noted that the basic purpose of these recesses is to provide an enlargement area which does not interfere with the manufacture of the integrally-lined valve body, but which provides an enlargement into which the liner material may creep or flow when the same is distended or undergoes thermal expansion due to operational conditions within the valve when in actual use. These portions of the liner material within the passages are, except for the aforementioned recesses, positively restrained from expanding, since they are completely encircled laterally by the walls of the passage, are bounded on one end by the tightly-fitting plug 26, and are bounded on the other end by the flared ends 42, which in installation are tightly secured between the end flanges 22 and 24 of the valve body and like end flanges of the conduits or pipes to which the valve is connected. As a result, severe thermal expansion of the liner material within the passages, when the same is so constrained and without any of the recesses 60, will cause buckling and failure of the liner in this area. The pocket-like recesses 60 of the invention provide very effective relief for this severe difficulty, allowing a certain amount of free outward thermal expansion of the liner within the passages.

METHOD OF MANUFACTURE

Figure 6:
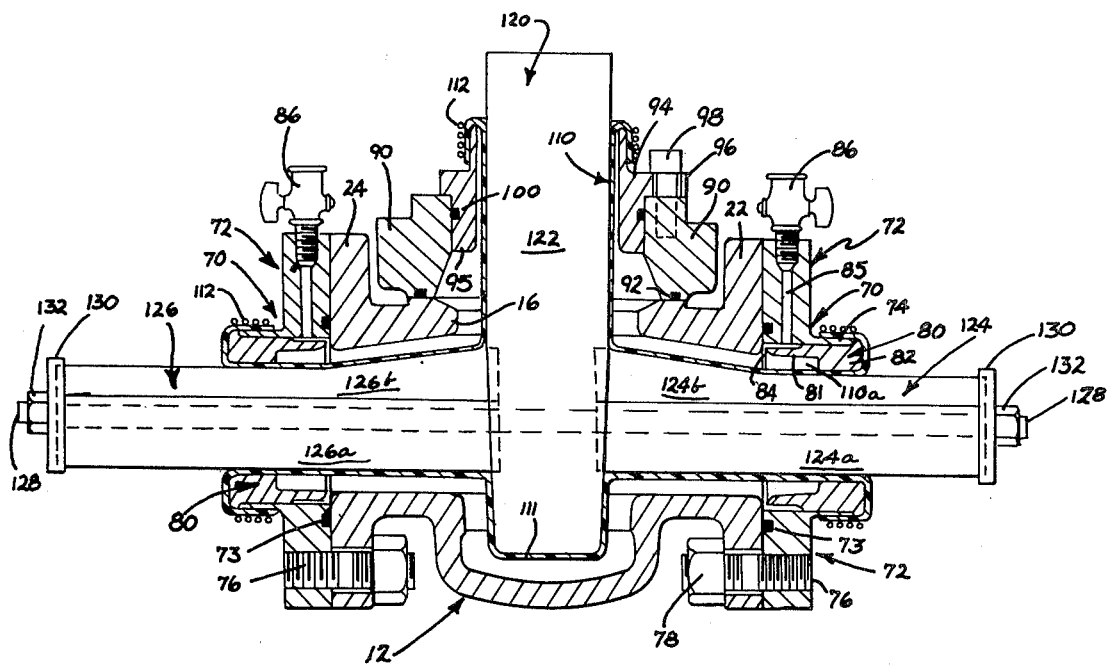
FIG. 6 is a sectional side elevation similar to FIG. 1, but showing components used in the manufacture of the lined valve.
Figure 5:
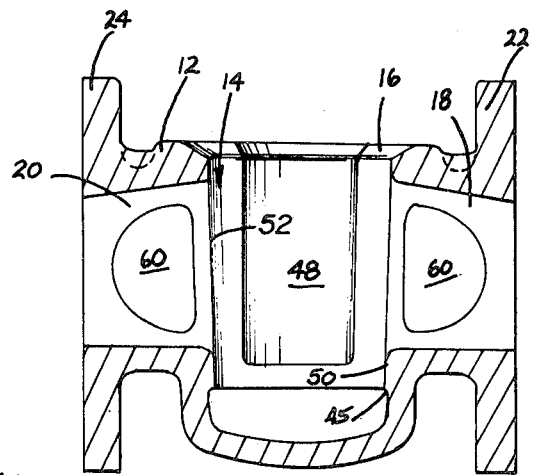
FIG. 5 is a sectional side elevation similar to FIG. 1, but showing only the valve body, without the lining.
Figure 4:
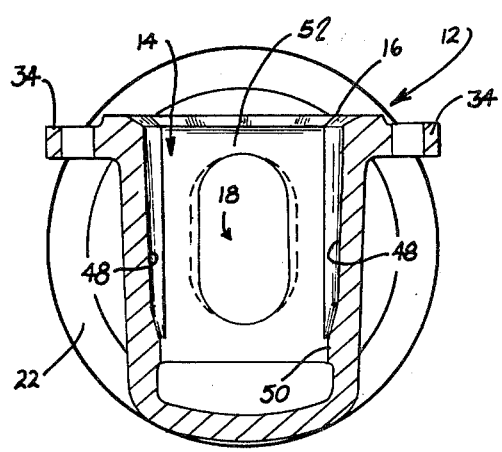
FIG. 4 is a sectional end elevational view similar to FIG. 2, but showing only the valve body, without the lining.
Figure 7:
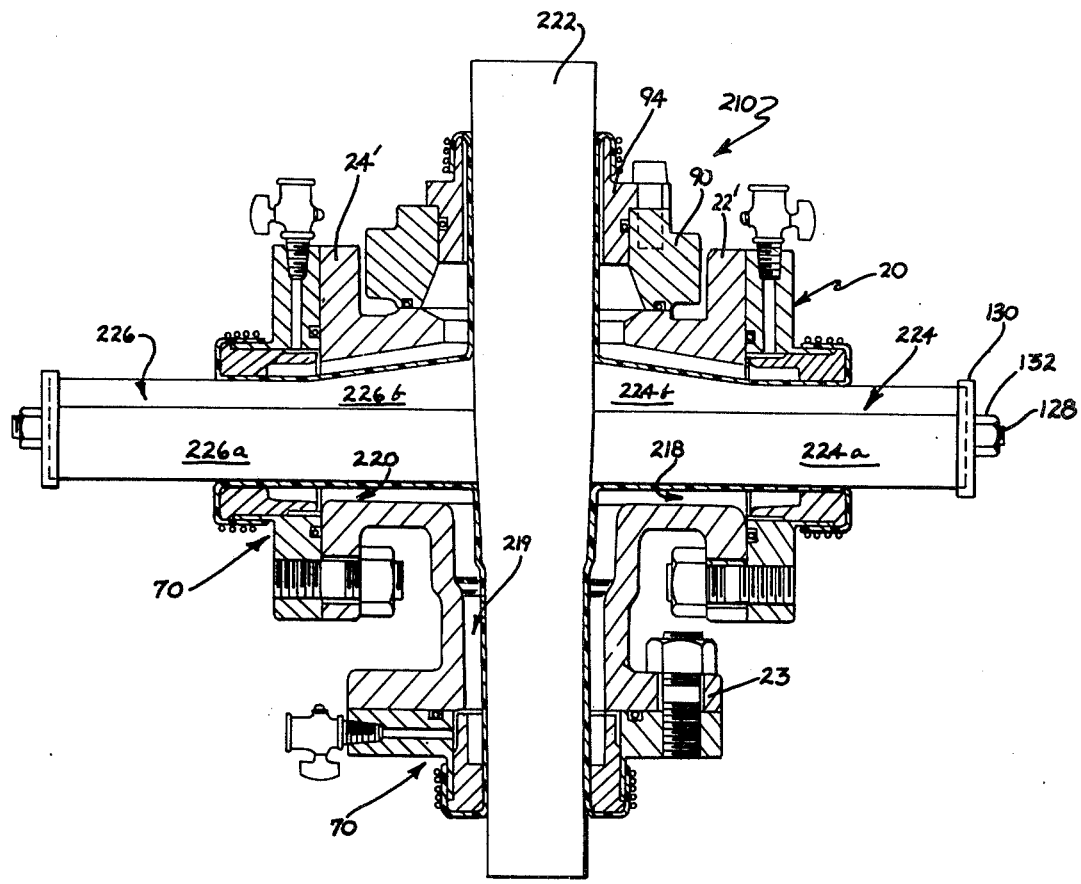
FIG. 7 is a sectional side elevational view similar to FIG. 6, but showing the invention practiced on a three-way valve.

In the preferred embodiment of the invention (which, broadly, is quite applicable to the manufacture of lined fluid flow-controlling members generally, including T or L fittings and the like), the integral liner is formed in place within the valve body in a manner which can be understood by a study of FIGS. 6 and 7. Referring first to FIG. 6, it will be noted that the valve body 12, without the liner yet formed in place, has a pair of end fittings or fixtures 70 secured in position in flush abutting relation to each of the end flanges 22 and 24. As illustrated, each of the end fixtures 70 may comprise a first member 72 which is in essence a round, flat plate having a central opening and a tubular outwardly-extending lip or flange 74 surrounding such opening. Each member 72 is secured in place by studs 76 which register with and are inserted through the bolt holes in the end flanges of the valve body. Nuts 78 are threaded onto the studs 76 to securely hold the members 72 in such position. Each of the members 72 has a flat inner face which fits flush against the outer face of the corresponding end flange 22 or 24, and an O-ring 73 is carried in an annular groove in the flat inner face of the members 72 to effect a seal between such member and the end flange against which it is fitted. The end fixtures 70 also preferably include a second member 80 having the form of an annular collar, with a narrow forwardly-projecting portion 81 and a thicker rear portion 82. As illustrated, the outer periphery of the member 80 defines a smooth cylindrical curvature which fits smoothly but snugly into the central opening in the first member 72, i.e., inside the annular lip 74. The outer surface of the forwardly-projecting portion 81 of member 80 is also basically cylindrical, but is of a decreased diameter, so as to define a narrow tortuous passage 84 which extends between the innermost end of portion 81 and the end flange 22 or 24, and between the outer surface of portion 81 and the inner surface of member 72, inside the central opening of the latter. Further, member 72 has a passage 85 formed therein which communicates with the narrow passage 84 just mentioned. A conventional shutoff valve fitting or petcock 86 mounts in a tapped hole in the member 72, in flow communication with its passage 85.

The upper end of the valve cavity, at the neck portion 16, is also closed off in a manner similar to that just discussed in connection with the outer ends of the port passages. That is, a first fitting or fixture member 90, consisting essentially of an annular collar, is placed atop the valve body over the neck opening, where it may be secured in place in the same manner as the plug-retaining plate 30 discussed above, using the bolt bosses 34. The collar 90 has a flat inner end face which mates flush against a flat annular portion of the valve body surrounding the neck opening, and an O-ring or like seal member 92 carried by the member 90 provides an airtight seal therebetween. A top member 94, also comprising an annular collar but having a smaller diameter than the first member 90, fits into the latter and has bolt bosses 96 carrying bolts 98 by which the top member may be tightened into place in flush abutment against the first member 90. The second member 94 has a projecting forward portion 95 which fits inside the first member 90, and this projecting portion has a cylindrical outer periphery which fits snugly against the corresponding side of the member 90. An O-ring 100 or like member is carried in a groove on the outer side of the forward portion 95 to provide a seal between the member 90 and 94.

In forming the integral liner within the valve body 12, the empty valve body has a flexible forming element 110 inserted in place therein, in the general position shown in FIG. 6. This forming element is preferably a rubber or like elastomeric baglike member of generally T-shaped overall configuration, with hollow tubular leg portions having open end extremities, such leg portions forming the crossbar and post of the T-shaped configuration. A short tubular portion 111 projecting beyond the crossbar has a closed end, as illustrated. Basically, the natural or normal shape of the forming element defines the desired shape of the lined passages to be formed within the valve body. The end fixtures 70 and the top fixture 90 are fitted into the illustrated positions when the forming element 110 has been inserted into place (although the fittings may be so positioned prior to insertion of the forming element, even though this is not the most convenient approach). The open ends of the tubular legs of the forming element are then elastically stretched outwardly and folded back over the protruding portions of the end fixtures, as illustrated. It is desirable to clamp or bind these end extremities in such position, and elastic bands 112 may be conveniently used for this purpose. With the forming element 110 secured in the aforementioned position, a vacuum pump is connected to the petcocks 86 and air is evacuated from the space between the outside of the forming element and the inside of the valve body. This expands the forming element outwardly and into tight contact against the inner confines of the valve body. The petcocks 86 are then closed to maintain this condition, and a mandrel 120 is then inserted in place inside the expanded forming element.

Basically, the mandrel 120 has three main components or sections, including a generally cylindrical center section 122 which is fitted downwardly into the bore, and a pair of identical lateral sections 124 and 126, each of which is fitted into one of the port passages through its open end and placed into position with respect to the center section 122. Each of the lateral sections comprises two separate parts, including a lower part 124a and 126a and an upper part 124b or 126b which interfit together in the manner illustrated and have their inner ends received within appropriate recesses formed in opposite sides of the center section 122. The cross-sectional shape of the assembled lateral sections corresponds closely at each point along their length to the desired shape of the lined port passages to be formed, just as the cross-sectional shape of the center section 122 corresponds closely at points along its length to the shape desired for the lined bore. Thus, each of the upper parts 124b and 126b of the corresponding lateral sections is larger in cross section at its innermost extremities near the bore than it is outwardly of the bore, whereas the lower parts 124a and 126a may be generally uniform in cross section along their length. These lower sections each have a longitudinal bolt passage formed therein which registers with that of the other and with a similar passage drilled transversely through the center section 122, such that an elongated tie bolt 128 may be inserted therethrough when the mandrel components are all in their proper relative relationship. As will be understood, in the assembly of the mandrel the center mandrel section 122 is placed into position and each of the upper parts 124b and 126b of the lateral mandrel sections is inserted and held in position while its corresponding lower part, being of uniform cross section, is then slid endwise into its final position, shown in FIG. 6. The tie bolt 128 is then inserted into place, and dished washers 130 are slid over the protruding ends of the tie bolt, such that the dished configuration of these washers cages the end extremities of each set of upper and lower lateral mandrel parts, as illustrated. A nut 132 is then threaded on each end of the tie bolt to tighten the washers 130 in place and secure the assembled mandrel together.

After assembly of the mandrel in the foregoing manner, the vacuum or partial pressure previously drawn on the assembly through the petcocks 86 is released, whereupon the forming element 110 resiliently contracts tightly about the mandrel. In this connection, it should be noted that the mandrel components should be of approximately the same size, or slightly larger than, the normal or relaxed size of the corresponding portions of the forming element, so that the latter will tightly contract about the mandrel. Thus, the tightly-covered mandrel, which should be of a relatively hard and rigid material, provides an inner form or pattern, about which the liner may be formed. That is, a predetermined clearance space will have been provided at all points throughout the bore and port passages between the tightly-covered mandrel and the inner confines of the valve body. Access to this clearance area is provided by removing the top fitting 94, and through this access opening the granular liner material may be poured.

As stated previously, the pouring of granular PTFE material for such molding operations is, at least broadly, readily understood at the present time. It may be stated, however, that such material, when in the particle size range normally considered as a powder (with particle sizes on the order of 35 microns) does not have flow characteristics as beneficial as may be desired, and tends to cake up, whereas more granular material (with particle sizes on the order of 500 microns) flows very well, and also has considerably less mold shrinkage; consequently, the latter material is to be preferred. In pouring the granular material downwardly into the valve body and around the covered mandrel, it is beneficial to rapidly vibrate the valve body, as for example in an appropriate fixture on a commercial vibration table or the like. By following this procedure, the entire clearance space within the valve body can readily be filled with the particulate liner material, with full flow throughout the clearance space, including laterally outwardly to the ends of the clearance space provided in the port passages. The clearance space is filled in this manner to approximately the top of the upper fixture member 90.

When the clearance space within the valve cavity has been filled with the particulate liner material in the manner just described, the top fixture member 94 is slid over the upper leg of the resilient forming element 110 covering the center mandrel section 122, and pushed downwardly toward the position illustrated in FIG. 6. The bolts 98 are then started, and gradually drawn tight, whereupon the protruding portion 95 of this fixture member pushes downwardly on the liner material and lightly compacts the same. The end extremities of the port passages are tightly closed by the interfitting fixture members 80 and the lateral mandrel sections 124 and 126, with the forming element 110 in place therebetween, and in this manner the mandrel sections are also held in the desired centered position with respect to the valve body. With the bolts 98 drawn tight and the top fixture 94 seated in position, the upper extremity of the forming element 110 is then secured in place over the top of the fitting 94, as before, following which a vacuum pump is again applied to the assembly through the petcocks 86. This exhausts air from between the particles of the liner material and, in proportion to the amount of vacuum so applied, the resilient forming element is again enlarged, expanding outwardly toward the interior walls of the valve body and compressing the particles of liner material against one another and against such walls. This compressing action preforms the particulate liner material into a reasonably coherent liner preform which is relatively stable structurally when carefully handled, although in a more absolute sense it is a very weak structure. This expansion of the forming element 110 releases the latter from the mandrel assembly components, thereby allowing the latter to be withdrawn from the valve body. This is accomplished by removing at least one of the nuts 132, withdrawing the tie bolt 128 and removing the washers 130, sliding the lower lateral section parts 124a and 126a outwardly, withdrawing the upper lateral section parts 124b and 126b, and then drawing the central section 122 upwardly and out of the valve body. Throughout this procedure, the expanded liner remains in firm contact with the partially compressed liner material, as a result of the vacuum applied thereto.

Following the foregoing steps, the entire remaining assembly is subjected to extensive compression forces, preferably by immersion in an isostatic molding or compression tank, with pressures gradually being raised to approximately 5000 psi, or thereabouts. During this step, the liner material particles are very substantially compressed against the walls of the valve body, through further expansion of the forming element 110. Following such compression, the compressed liner material has substantially the desired configuration, although it is still structurally weak, at least with regard to forming or shear forces. The tension element 110 may then be removed, however, leaving only the fully-lined valve cavity. The latter is then subjected to heat in what may generally be described as a curing step, but which in particular effects the sintering of the compressed liner material particles into a completely cohesive and relatively strong structure. As is known, PTFE material of the type mentioned above is sintered at temperatures of approximately 700° F, preferably by gradually increasing the temperature to such point, holding it for a desired length of time, and then gradually decreasing the temperature once again.

In accordance with the foregoing process, an extremely desirable lining is formed, which has excellent density and void-free properties and which completely covers the interior of the valve body, with a substantial thickness of the liner material. Further, the outer configuration of the lining very closely conforms to the inner configuration of the valve body, mechanically locking the integral lining into place beneath the shoulder 45 at the bottom of the bore and above the neck opening 16, where the shape of the top of the neck portion and the shape of the inner surfaces of the upper fixtures 90 and 94 defines the outer shape of the protruding crown 46 mentioned previously.

During the foregoing process, the areas at the ends of the port passages, between the extending portions 81 of the end fixture members 80 and the forming element 110, provide for the formation of tubular lining extensions 110a, which are integral with the lining portion covering the inside of the port passages. It is these extending tubular ends 110a which form the flared ends 42 mentioned above (although the latter may be manufactured in flared form directly, in the first instance, by use of appropriate end fixtures), and the flaring of these tubular extremities is also an important part of the invention. That is, the compressed and sintered integral lining is completed by first sizing the bore, preferably while the valve and lining are still at an elevated temperature of approximately 400° F as a result of the sintering step. The bore is sized by forcing a heated dummy plug into the same, such form or dummy having the same size as the actual plug which ultimately will be installed, and being heated to a temperature in the range of about 650° F.

This procedure not only accurately sizes the lined bore to receive the plug, but also acts to distend the lining within the port passages or runs, inasmuch as the PTFE material which is preferred has a coefficient of thermal expansion on the order of ten times that of the metal from which the valve body is to be made. During this sizing step, the thermally-expanded lining material creeps outwardly within the port passages, and is to a significant extent received within the pocket-like recesses 60 formed in the lateral sides of these passages. Further, however, there is a definite endwise extension of the liner material from the ends of the port passages, outwardly beyond the mounting flanges 22 and 24. Under these conditions, with the heated dummy plug in place, the open ends of the liner portions 110a are flared outwardly by use of appropriate conical flaring tools, to form the flared ends 42. Preferably, this is accomplished by using a first flaring tool having a conical point with an angle on the order of 15°, and then using a flat finishing tool to complete the desired flaring of the liner ends into the flush disposition shown in FIGS. 1 and 3. As stated above, it is advantageous to carry out the foregoing flaring operation when the temperature of the valve body and the integral liner therewithin has declined, subsequent to sintering, to approximately 400° F; furthermore, it is important that the flaring tools be at elevated temperatures, e.g., approximately 650° F.

By effecting the flaring in the foregoing manner, subsequent cooling of the valve body and its integral liner to room temperature, with attendant thermal contraction of the lining, results in the establishment of tension forces on the portions of the lining within the port passages or runs, between those portions of the liner which are, in effect, trapped within the bore and those flared over the end extremities of the runs. This is a significant feature, since subsequent operation of the valve under conditions of highly-elevated operating temperatures will, of course, produce corresponding thermal expansion of the lining material, but a significant amount of such expansion is compensated for by the gradual reduction of the tension forces, which must be overcome before actual physical expansion of the liner can occur. This benefit is carried forward by the presence of the aforementioned recesses 60 in the sides of the port passages, which provide a space into which the liner material can expand upon undergoing additional thermal effects. This provides a valve having very desirable operational characteristics throughout all conceivable temperature ranges in which it may be expected to operate, thereby achieving a fully-lined valve which not only has a desirably thick and dense integral liner which is not stretched thin and made vulnerable at particular areas, but which additionally has lined port passages or runs which will not buckle and collapse under operation at highly elevated temperatures.

In the aforementioned sintering and subsequent cooling of the lined valve body, and in ensuing high-temperature operation, the somewhat enlarged, smoothly-curved dome-like bottom wall of the valve chamber is particularly beneficial, in that such a configuration has been found to avoid a problem of liner separation and cracking which may occur in manufacture with other chamber end configurations (most typically, in conventional valves, a flat end wall which may intersect the side walls at right angles and without any particular curvature therebetween) during the relatively wide temperature variations which are involved, and such configuration also provides another area into which distended linear material may creep upon undergoing thermal expansion.

In the embodiment of the invention illustrated in FIG. 7, the full range of advantages provided by the invention, and the full flexibility in application thereof, may be readily perceived. That is, in FIG. 7 a three-way or three-port valve 210 is illustrated as an example of multi-port structures generally. Valve 210 has three port passages, designated generally by the numerals 218, 219 and 220, which terminate in respective end flanges 22', 23, and 24' that are directly analogous to the end flanges of the port passages described hereinabove. In other respects, the basic elements of the valve body of FIG. 7 are similar to, or substantially the same as, those described above, there being recesses such as those designated by the numeral 60 hereinabove in each of the port passages 218, 219 and 220, as well as liner portions within such passages which are under tension between their flared end extremities and the bore. In this embodiment, each of the port passage end flanges has the same type of end fixture 70 described in connection with FIG. 6, and the same type of upper fixture members 90 and 94 are placed above the neck opening. Also, the mandrel components are essentially the same, except that the center section 222 is longer, extending downwardly through the neck opening and out the port passage 219 disposed in alignment therewith, the flexible forming element having a longer tubular leg in this region which is directly analogous to those tubular legs extending out of the other port passages 218 and 220. The steps in forming the integral linear are the same as those described above.

The resulting integral liner produced in the valve 210 of FIG. 7 provides a fully-lined, three-port or three-way valve of the same excellent characteristics mentioned above in connection with the embodiment of FIG. 6, and it is to be particularly noted that a lined multi-port valve of this nature (i.e., a valve having more than the usual two ports) has not been possible by the practice of prior art methods in this field, and has never heretofore been offered commercially.

It is entirely conceivable that upon examining the foregoing disclosure, those skilled in the art may come to appreciate that the invention may be embodied in fluid flow-controlling structures which differ from the particular embodiments shown and described herein, or may make various changes in details of the present embodiments. Furthermore, it should be understood that different aspects of the structures specifically disclosed and of the method of manufacture can advantageously be utilized separately; for example, the recesses within the runs of the valve body can be effectively used in T or L fittings, and such features can also be advantageously used in lined valves or the like whose lining is formed otherwise than by use of a resilient forming element and isostatic compression techniques, as, for example, by use of a similar mandrel and compression molding using pressure applied through the port and valve chamber openings in a valve body. Consequently, all such other embodiments or variations which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. In a method of manufacturing a fully-lined plug valve, of the type having a valve body defining a generally cylindrical bore for receiving a plug-like valve member which is rotatable within such bore to open and close a flow path through the latter, and defining at least two laterally-enclosed port passages communicating with and leading to and from said bore, the improvement comprising: molding an integral liner of corrosion-resistant material in place within and covering the internal surfaces of said port passages and said bore; sizing the lined bore by forcing a heated plug-shaped member downwardly thereinto and thereby longitudinally distending liner material within said passages at least slightly outwardly in a direction away from said bore; and then flaring linear material laterally outwardly and over portions of the end extremities of said passages, to cause the liner material within the passages to be under tension forces acting longitudinally of said passages in the area between said bore and said passage end extremities under normal conditions at room temperature.

2. The improved method of manufacture recited in claim 1, wherein said step of molding said integral linear in place includes the concurrent forming of tube-like linear portions integral with the liner portions covering said passages and extending lengthwise beyond the said end extremities of the latter.

3. The improved method of manufacture recited in claim 1, wherein said molding step comprises compacting comminuted or generally granular liner-forming material into place within said passages and said bore and then sintering the compacted material in place.

4. A method of lining a fluid flow-controlling member with a layer of corrosion-resistant material fully covering the interior thereof, comprising the steps: providing a generally hollow resilient forming element having an external shape generally corresponding to the shape of the desired lined passage within said member and inserting said element inside such member; resiliently expanding said forming element while inside of said member outwardly toward the interior surfaces of said member; inserting into said expanded forming element a mandrel having outwardly projecting component leg portions which are disposed at relative angles with respect to one another; resiliently contracting said forming element about said mandrel to provide a clearance space between the contacted forming element there upon and the internal walls of said member; loading a quantity of said corrosion-resistant lining material into said clearance space; resiliently expanding said forming member away from said mandrel to at least slightly compress said material, removing the mandrel from said forming element, and removing said forming element from said member.

5. The method of claim 4, wherein said mandrel has mutually-separable projecting leg components and such components are inserted severally inside said expanded forming element and assembled together within the latter.

6. The method of claim 4, including the step of heating said member and the compressed lining material therewithin, to cure the latter in place.

7. The method of claim 5, wherein said mandrel is disassembled and its leg components are removed prior to said further compressing of said material.

8. The method of claim 7, wherein said forming element is left in place during said further compressing of said material.

9. The method of claim 8, wherein said further compressing is accomplished by applying pressure to the interior of said forming element to resiliently expand the latter against said lining material.

10. The method of claim 8, wherein said forming element is removed after said further compressing, and said member and the compressed liner material in place therein are then heated to cure such material in place.

11. The method of claim 5, wherein the fluid flow-controlling member which is lined is a valve body of the type used in plug valves, having a plug chamber opening out of such body, and having port passages intersecting such chamber at an angle to the longitudinal axis thereof and terminating at open ends positioned a distance from the chamber, and wherein said method includes the steps of: inserting generally tubular legs of said forming element into each of said port passages and into said chamber, and arranging an end of such legs to protrude outwardly of said body through said passage ends and chamber opening; resiliently expanding each of said tubular legs to diametrically enlarge the same; inserting one of said mandrel leg components through said chamber opening and into the expanded leg of the forming element protruding therefrom; inserting another of said mandrel leg components into each of said port passages and through the expanded legs of said forming element disposed in such passages; connecting each of said mandrel components together in their said inserted positions; resiliently contracting each of said tubular legs of said forming element about the mandrel leg component inserted thereinto; and, after loading said lining material into place, resiliently expanding said tubular legs to compress the lining material adjacent the same.

12. The method of claim 11, wherein at least one of said mandrel components is inserted into position by dividing the same into at least two parts, inserting said parts individually into place, and assembling such parts together when the same are substantially in place.

13. The method of claim 11, including the steps of affixing an end fixture to certain of said passage ends and using such fixtures to position said mandrel components with respect to the axis of such passages.

14. The method of claim 11, including the step of resiliently expanding said tubular legs of said forming element by drawing air from between the inside of said passages and the outside of the legs positioned therewithin.

15. The method of claim 14, including the steps of affixing an end fixture to certain of said passage ends and using such fixtures to position said mandrel components with respect to the axis of such passages, and drawing said air through passages defining by said end fixtures.

16. The method of claim 15, including the steps of securing said protruding ends of said tubular forming element legs to said end fixtures in a generally airtight manner.

* * * * *